United States Patent [19]

Jones

[11] Patent Number: 5,021,648
[45] Date of Patent: Jun. 4, 1991

[54] MOTION TRANDUCING THROUGH CONVERSION OF LINEAR MOTION TO CIRCULAR MOTION

[75] Inventor: Donald R. Jones, Chester, N.H.

[73] Assignee: Doble Engineering Company, Watertown, Mass.

[21] Appl. No.: 486,150

[22] Filed: Feb. 28, 1990

[51] Int. Cl.⁵ .............................................. G01D 5/34
[52] U.S. Cl. .......................... 250/231.13; 250/237 G
[58] Field of Search ...................... 250/231.13, 231.18, 250/237 G; 324/175; 33/707

[56] References Cited

U.S. PATENT DOCUMENTS

| | | | |
|---|---|---|---|
| 2,851,676 | 9/1958 | Woodcock et al. | 324/175 |
| 3,510,759 | 5/1970 | Nador | 250/231.14 |
| 3,511,574 | 5/1970 | Burgarella | 250/231.1 |
| 4,224,604 | 9/1980 | Angst | 250/231.18 |

OTHER PUBLICATIONS

Rickley et al., "Doble Circuit-Breaker Analyzers (Developments and Field Experiences)" 1979, Doble Engineering, 46AIC79.
Rickley et al., "The Doble Type TR-2 Circuit-Breaker Analyzer (A Progress Report)" Doble Engineering, 45AIC78.
Woodward, "New Doble Circuit Breaker Motion Analyzer" 1972, Doble Engineering, 39AIC72.
"Circuit-Breaker Analyzer Type TR-2/PR-2" Doble Engineering, TR-2-1811 Apr. 79.
"Circuit-Breaker Motion Analyzer Type TR-1A/PR-1A" Doble Engineering, TR-1A-183.
Price List, M&G Instrument Company, Apr. 1, 1979.
"Circuit Breaker Operation Analyser", The Cincinnati Clock & Instrument Co.
"Doble Type TR-2 Circuit Breaker Motion Analyzer Instruction Manual" Doble Engineering, pp. 1-2,1-4,-1-16,2-5,4-1,5-7-9,6-50-56.

Primary Examiner—David C. Nelms
Assistant Examiner—Khaled Shami
Attorney, Agent, or Firm—Fish & Richardson

[57] ABSTRACT

A motion transducer includes a rotatable wheel, a drive assembly that engages a movable rod in contact with the circumference of the rotatable wheel, and an encoder that measures the rotation of the rotatable wheel and that encodes information relating to the rotation of the rotatable wheel. Linear motion of the movable rod causes rotation of the rotatable wheel, the angular displacement of the rotatable wheel being proportional to the linear travel of the rod.

12 Claims, 4 Drawing Sheets

MOTION TRANDUCING THROUGH CONVERSION OF LINEAR MOTION TO CIRCULAR MOTION

The present invention relates in general to motion transducing and more particularly concerns measuring movement of a rod that may be connected to a circuit breaker or similar device.

The Doble Engineering Company sales literature, "Circuit-Breaker Motion Analyzer Type TR-1A/PR-1A," shows a motion transducer that is used to measure the velocity and displacement of a rod that is connected to the moving parts of a circuit-breaker. The moving rod attaches to a clamp that slides up and down a pole. The clamp connects with a cable wire that moves with the clamp as the clamp slides up and down the pole. The cable wire travels around a pulley at the top of the pole, and around the circumference of a wheel at the bottom of the pole. The wheel rotates in conjunction with a shaft that connects with a tachometer, which measures angular velocity of the wheel, and a potentiometer, which measures the angular displacement of the wheel. The tachometer and the potentiometer produce analog signals representative of the angular velocity and the angular displacement, respectively, of the rotating wheel, which in turn are representative of the linear velocity and the linear displacement, respectively, of the moving rod. The analog signals are processed by a motion analyzer, which plots the velocity and displacement of the rod as a function of time on a plotter.

It is an important object of the invention to provide an improved motion transducer.

According to the invention, there is a motion transducer that includes a rotatable wheel, a drive assembly that engages a movable rod in contact with the circumference of the rotatable wheel, and an encoder that measures the rotation of the rotatable wheel and that encodes information relating to the rotation of the rotatable wheel. Linear motion of the movable rod causes rotation of the rotatable wheel, the angular displacement of the rotatable wheel being proportional to the linear travel of the rod. The center of the rotatable wheel preferably is connected to a shaft that rotates axially with the rotatable wheel and that is adapted to be coupled with a rotatable component by means of a rotary adapter. The rotary adapter thus enables the motion transducer to measure rotary motion instead of linear motion. The rotary adapter preferably includes a pin that causes a switch in the motion transducer to indicate that the rotary adapter is attached to the motion transducer. The angular rotation of the wheel is preferably detected by an encoder having moving parts with low inertia. The encoder preferably produces digital outputs, which are not likely to be corrupted by noise in the environment.

It is not necessary to provide motion transducers of multiple sizes to accommodate movable rods that exhibit varying amounts of displacement, because motion transducers according to the invention can accommodate rod displacements of any length. Moreover, motion transducers according to the invention can be relatively compact. The invention does not utilize a cable wire that wraps around the circumference of the rotatable wheel, and thus there are no errors due to vibration or elongation of a cable wire after sudden movements of the movable rod. The overall inertia of the moving parts of motion transducers according to the invention does not include the inertia of a cable wire or of a moving clamp, and therefore motion transducers according to the invention can accommodate accelerations of the movable rod of up to 400 g's over short periods of time and 100 g's over sustained periods without substantial errors.

Numerous other features, objects, and advantages of the invention will become apparent from the following detailed description when read in connection with the accompanying drawings in which.

Figure 1:
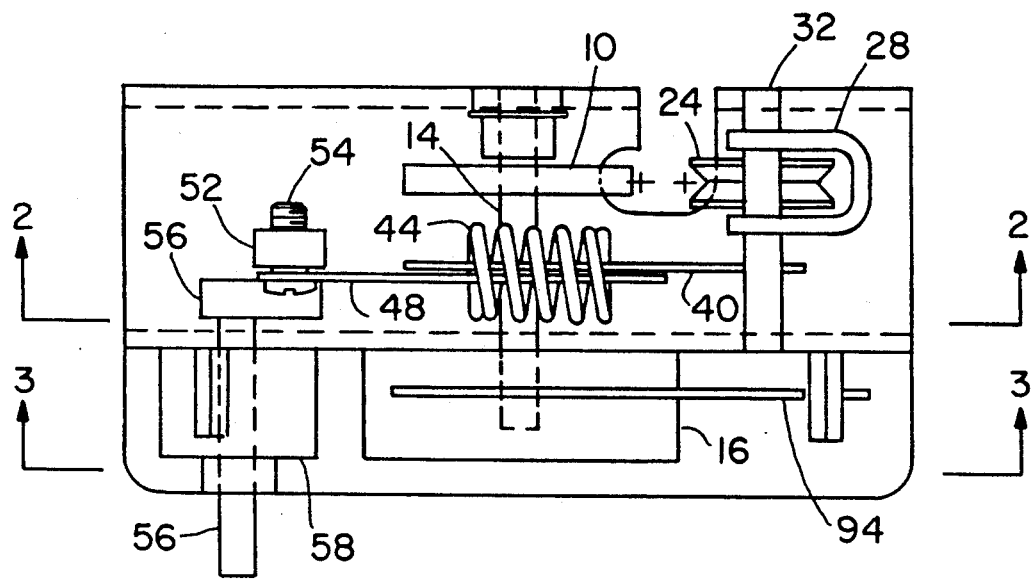
FIG. 1 is a sectional top view of a motion transducer according to the invention, showing the drive assembly in its disengaged state.

With reference now to the drawings, and more particularly FIGS. 1 through 5 thereof, there is shown a motion transducer that can be used to measure the linear displacement and linear velocity of a rod 8. Rod 8 may typically be connected to a threaded hole in a moving part of a circuit breaker switch that is used in high voltage lines that lead to and from a substation of an electrical power network. The motion transducer has a mounting plate 6 that can be used to attach the motion transducer to a fixed, stationary support structure. The motion transducer includes a light weight aluminum wheel 10, which is typically 1.59 inches in diameter, and which has a rim that is wide enough (0.20 inches) to provide a good interface with rod 8. Wheel 10 has a set of holes 12 drilled therethrough in order to reduce the mass of wheel 10. Wheel 10 is mounted on shaft 14, which rotates with wheel 10. One end of shaft 14 extends into digital pulse encoder 16, while the other end of shaft 14 is exposed through plate 18 of the transducer housing. The end of shaft 14 that is exposed through plate 18 contains a hexagonal hole 20 that can be used to couple the motion transducer with a rotary adapter 62 in order to measure rotational velocity and rotational displacement of a rotatable component.

Figure 2:
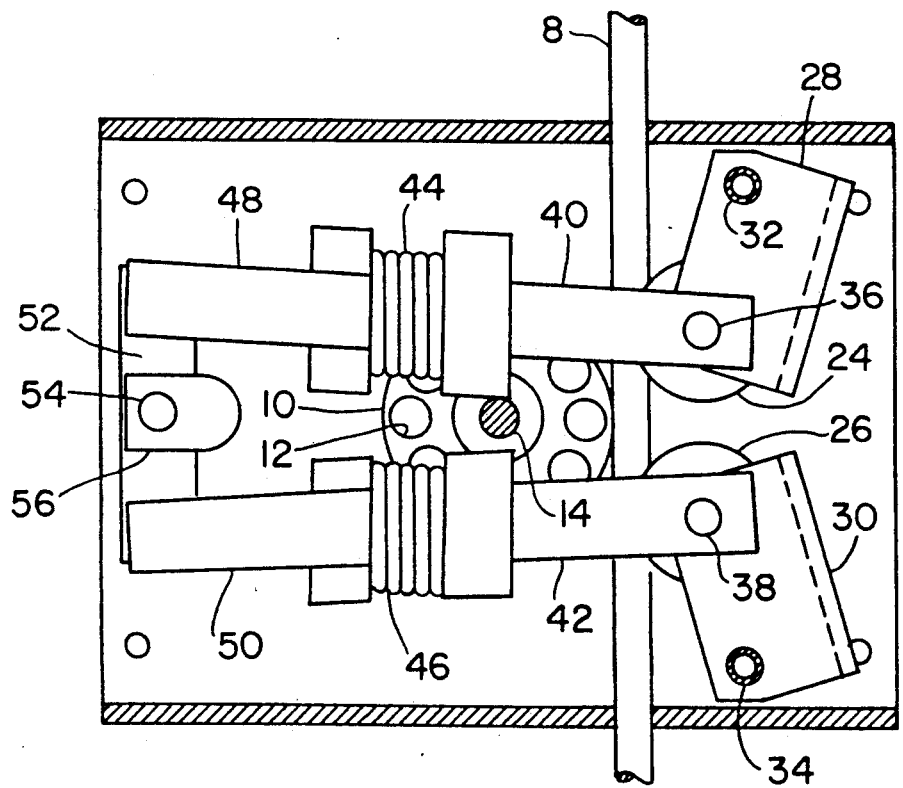
FIG. 2 is a sectional view of a motion transducer according to the invention through section 2—2 of FIG. 1, showing the drive assembly engaging a movable rod in frictional contact with the circumference of the rotatable wheel.
Figure 3:
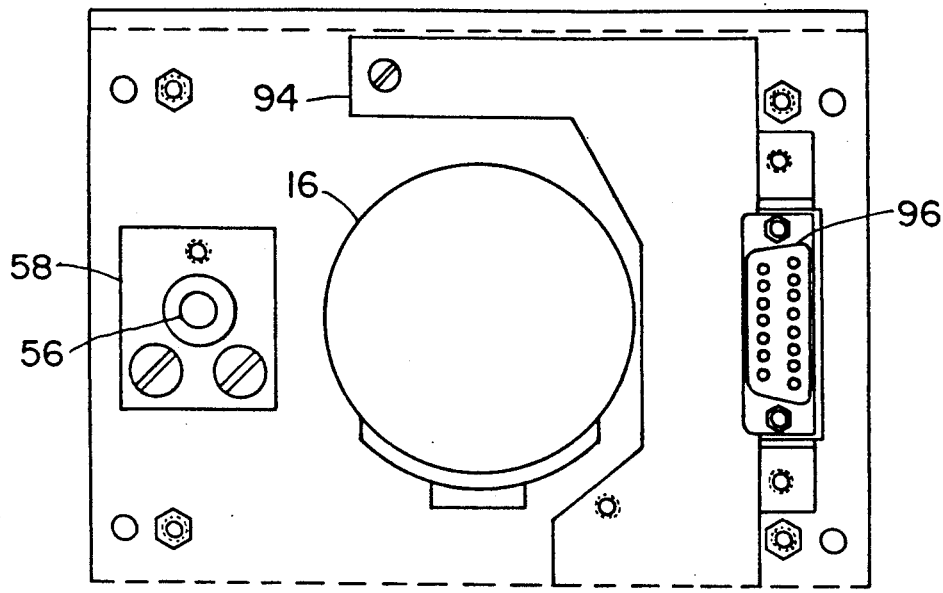
FIG. 3 is a sectional view of a motion transducer according to the invention through section 3—3 of FIG. 1.
Figure 4:
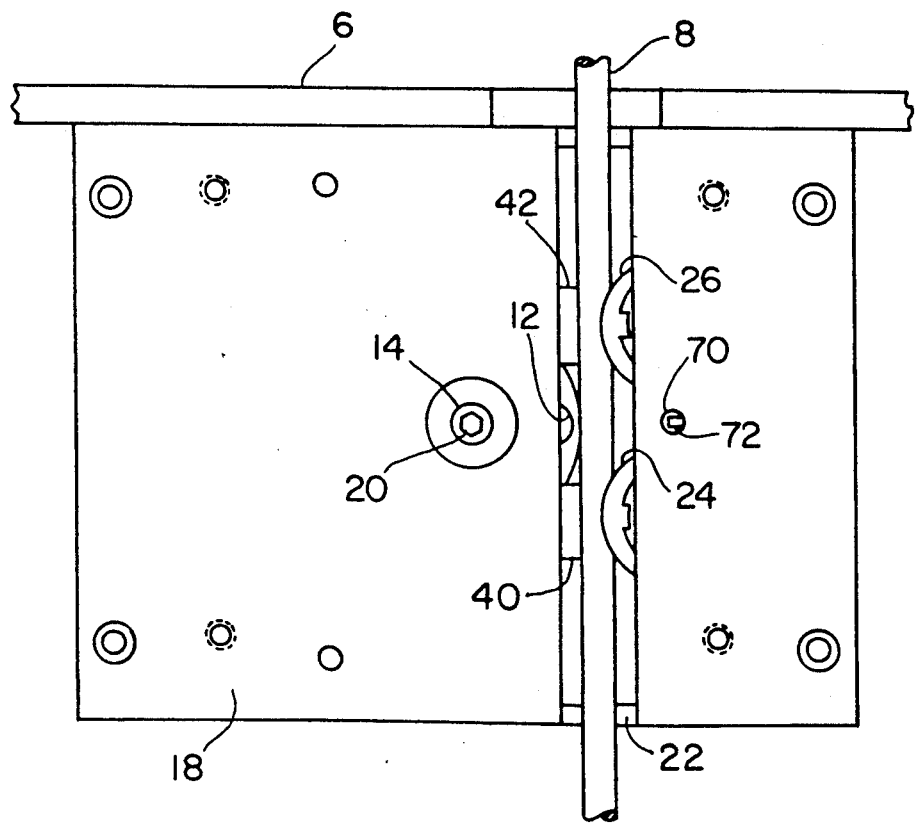
FIG. 4 is a side view of a motion transducer according to the invention.
Figure 5:
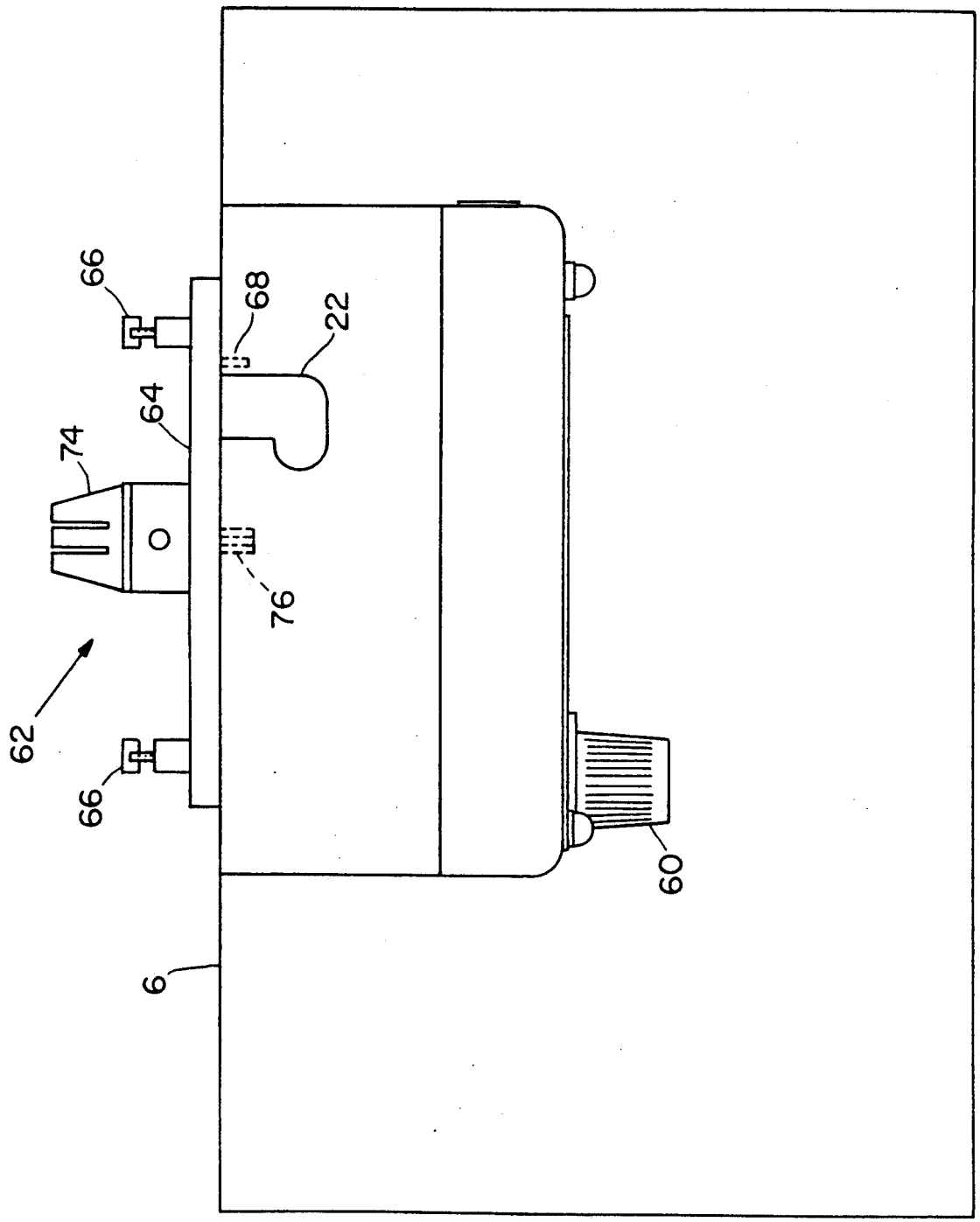
FIG. 5 is a top view of a motion transducer according to the invention, showing a rotary adapter attached to the motion transducer.

Plate 18 has a slot 22 into which a movable rod may be inserted. The rod fits into a space between a pair of pulleys 24 and 26 and the rim of wheel 10. A pair of idler hinges 28 and 30, which pivot about shafts 32 and 34 respectively, support pulleys 24 and 26 respectively. FIG. 1 shows pulleys 24 and 26 pivoted away from the rim of the wheel 10 in order to allow a movable rod 8 to be inserted in the space between pulleys 24 and 26 and wheel 10. FIG. 2 shows pulleys 24 and 26 engaging rod 8 in frictional contact with the rim of wheel 10.

Wheels 24 and 26 turn around shafts 36 and 38 respectively. A pair of thin T-shapes arm 40 and 42 connect with shafts 36 and 38. Springs 44 and 46 wrap around arms 40 and 42 respectively and are attached thereto. T-shaped arms 48 and 50 extend through springs 44 and 46 in a direction opposite to arms 40 and 42. Arms 48 and 50 connect with opposite ends of a bar 52. A screw 54 connects a cam 56 to the center of bar 52. Cam 56 has a shaft that extends through a block 58 and beyond the housing of the motion transducer. A knob 60 attaches to the end of the cam shaft.

Rotary adapter 62 includes a plate 64 having a set of captive screws 66 that secure plate 64 to plate 18. Plate 64 also includes a pin 68 that extends through a hole 70 in plate 18 to trip a mechanical switch 72 within the motion transducer, to indicate to the motion transducer that rotary adapter 62 is attached to the motion transducer. Rotary adapter 62 includes a drill chuck 74 that clamps onto the rotatable component, and a hex shaft 76 that turns with drill chuck 74 and that fits into hexagonal hole 20 in shaft 14 of the motion transducer.

Figure 6:
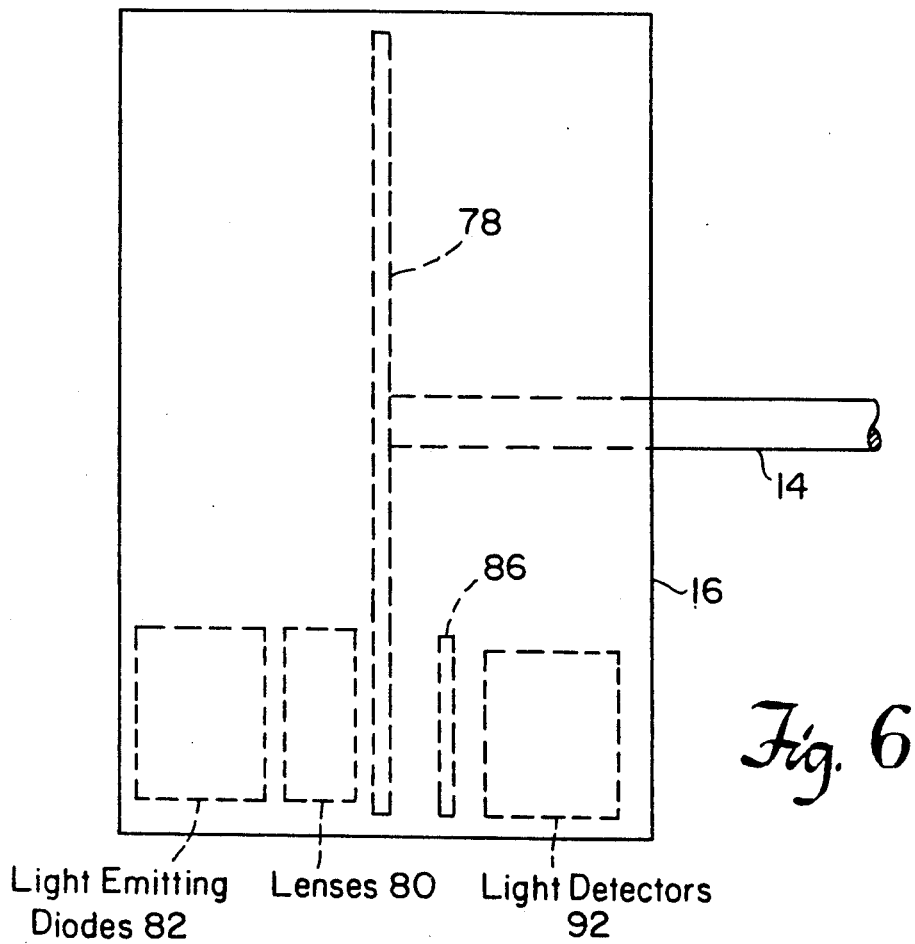
FIG. 6 is a diagrammatic representation of an optical shaft encoder for use in a motion transducer according to the invention.
Figure 7:
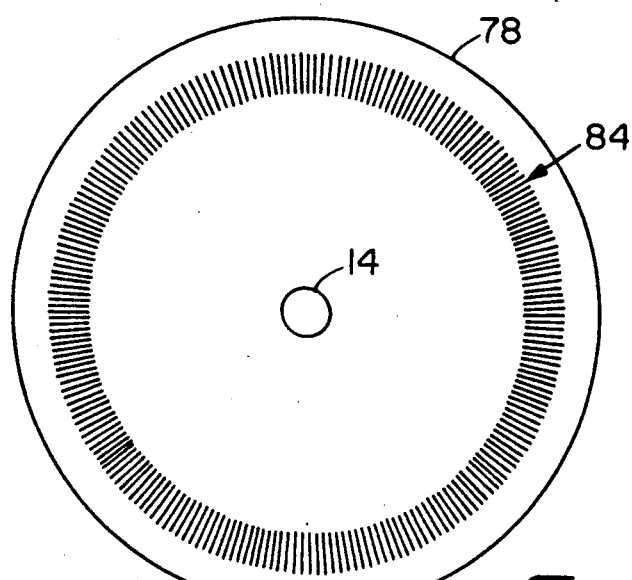
FIG. 7 is a perspective view of a disk for use in an optical shaft encoder of a motion transducer according to the invention.

Optical shaft encoder 16 may preferably be a Hewlett Packard device, part number HEDS-7501. FIG. 6 shows the inside of a typical optical shaft encoder 16, which includes a lightweight disk 78 that attaches to shaft 14 and rotates therewith. Disk 78 contains a large number of small thin slots 84 on its periphery, as shown in FIG. 7. A plate 86 located adjacent to disk 78 contains four similar small thin slots positioned directly behind slots 84 on the periphery of disk 78.

A pair of lenses 80 collate light beams from two respective light-emitting diodes 82. Each of the two light beams passes through the narrow slots 84 on the periphery of disk 78 and through the slots located in plate 86 only when the slots 84 on the periphery of disk 78 and the slots in plate 86 line up. The slots in plate 86 are positioned in a manner such that each of the two light beams is aimed at a respective pair of slots in plate 86, such that within each pair of slots in plate 86 light passes through one slot if and only if the other slot is blocked, and such that the two rectangular light pulse trains that pass through one pair of slots are 90 degrees out of phase with the two rectangular light pulse trains that pass through the other pair of slots. The four rectangular light pulse trains that result as disk 78 turns are detected by four light detectors 92. Detectors 92 produce electrical signals corresponding to the rectangular light pulse trains and transmit the electrical signals to a printed circuit board 94, which contains cable driver chips to condition the electrical signals for transmission, by means of a cable connected to cable connector 96, to an analyzer that processes the information contained in the electrical signals.

Having described the structure of the motion transducer, its operation will be described. The motion transducer is used to measure such parameters as the total travel, the overtravel, the rebound, and the velocity through the arcing zone, of a circuit breaker for high-voltage lines leading to and from a substation. These parameters are typically tested about once a year or so. Rod 8 is secured into a threaded hole in a moving part of the circuit breaker.

In order to permit insertion of rod 8 into slot 22 of the motion transducer, the shaft of cam 56 is rotated, causing bar 52 and arms 48 and 50 to move in a direction toward pulleys 24 and 26. As arms 48 and 50 move forward, springs 44 and 46 expand, causing arms 40 and 42, which are attached to springs 44 and 46, to move in a direction toward pulleys 24 and 26. Arms 40 and 42 push pulley shafts 36 and 38 away from the rim of wheel 10, thereby providing enough roOm betWeen pulleys 24 and 26 and wheel 10, as shown in FIG. 1, for rod 8 to be inserted into slot 22.

After rod 8 has been inserted into slot 22, the shaft of cam 56 is rotated 180 degrees, causing bar 52 and arms 48 and 50 to move in a direction away from pulleys 24 and 26. As arms 48 and 50 move backwards, springs 44 and 46 contract, causing arms 40 and 42 to move in a direction away from pulleys 24 and 26. Arms 40 and 42 pull pulley shafts 36 and 38 toward the rim of wheel 10, thereby engaging rod 8 in frictional contact with the rim of wheel 10, as shown in FIG. 2.

Linear movement of rod 8 causes wheel 10 to rotate in conjunction with shaft 14. The rotation of shaft 14 causes disk 78 of optical shaft encoder 16 to rotate. Light from each of the light-emitting diodes 82 passes through the narrow slots 84 on disk 78 and two of the four slots on plate 86 to produce two of the four rectangular light pulse trains. Light detectors 92 detect the four rectangular light pulse trains and produces two electrical pulse trains, each electrical pulse train corresponding to one of the pairs of rectangular light pulse trains. The two electrical pulse trains alternate between zero and five volts. The cable driver chips on printed circuit board 94 condition the electrical pulse trains for transmission over a cable to an analyzer. The pulse trains that are transmitted over the cable alternate between minus fifteen and plus fifteen volts.

The analyzer counts the number of electrical pulse edges that occur in the two electrical pulse trains in 100 microseconds (four edges per wave cycle), and generates a two's complement binary number equal to the number of edges that occur in the 100 microseconds and having a positive or negative value depending on whether the two electrical pulse trains are plus 90 degrees or minus 90 degrees out of phase with each other. The value of the two's complement binary number is representative of the value of the angular velocity of disk 78, and the sign of the two's complement binary number is representative of the direction in which disk 78 is turning. The analyzer stores the two's complement number in memory. The analyzer sums the two's complement binary numbers to produce a number, representative of the angular displacement of disk 78, which the analyzer stores in memory. The analyzer can use the stored information to plot a graph of the linear displacement and linear velocity of rod 8.

To measure the angular velocity and angular displacement of a rotatable component, rotary adapter 62 is fastened onto plate 18 by means of screws 66. The end of a rotatable component is inserted into drill chuck 74, which is tightened to clamp onto the end of the rotatable component. Hex shaft 76, which fits into hexagonal hole 20 in the end of shaft 14, causes shaft 14 to rotate with the rotatable component. Pin 68, which fits into hole 70 in plate 18, trips switch 72, thereby indicating to the analyzer that the motion transducer is measuring angular velocity and angular displacement of a rotatable component.

There has been described novel and improved apparatus and techniques for measuring linear displacement and linear velocity of a rod that may be connected to a circuit breaker or similar device. It is evident that those skilled in the art may now make numerous uses and modifications of and departures from the specific embodiment described herein without departing from the inventive concept. Consequently, the invention is to be construed as embracing each and every novel feature and novel combination of features present in or possessed by the apparatus and technique herein disclosed and limited solely by the spirit and scope of the appended claims.

What is claimed is:

1. A motion transducer comprising
   a rotatable wheel,
   a drive assembly for engaging a movable rod in contact with the circumference of said rotatable wheel, in a manner such that linear motion of said movable rod causes rotation of said rotatable wheel, the angular displacement of said rotatable wheel being proportional to linear travel of said rod,
   an encoder for measuring said rotation of said rotatable wheel and for encoding information relating to said rotation of said rotatable wheel,
   and a shaft, connected to the center of said rotatable wheel, that rotates axially with said rotatable wheel,
   said shaft being adapted to be coupled with an end of a rotatable component,
   thereby enabling the motion transducer to measure angular motion of a rotatable component as well as linear motion of a rod.

2. A motion transducer in accordance with claim 1 further comprising a switch that indicates whether an adapter is attached to said motion transducer to couple said shaft with said end of said rotatable component.

3. A motion transducer in accordance with claim 1 further comprising
   an adapter for coupling said shaft with said end of said rotatable component,
   and a switch for indicating whether said adapter is attached to said motion transducer to couple said shaft with said end of said rotatable component,
   said adapter comprising a pin for causing said switch to indicate that said adapter is attached to said motion transducer to couple said shaft with said end of said rotatable component.

4. A motion transducer in accordance with claim 1 further comprising a shaft, connected to the center of said rotatable wheel, that rotates axially with said rotatable wheel, said shaft being connected also to said encoder, said encoder measuring said rotation of said rotatable wheel by measuring said rotation of said shaft.

5. A motion transducer in accordance with claim 1 wherein said encoder encodes said information relating to said rotation of said rotatable wheel digitally.

6. A motion transducer in accordance with claim 5 wherein said encoder is an optical shaft encoder comprising
   a disk that is coupled to said rotatable wheel in a manner such that said disk turns with said rotatable wheel,
   and a detector that measures angular displacement and direction of motion of said disk, and produces pulse trains encoding said angular displacement and said direction of motion.

7. A motion transducer comprising, a rotatable wheel,
   a drive assembly for engaging a movable rod in contact with the circumference of said rotatable wheel, in a manner such that linear motion of said movable rod causes rotation of said rotatable wheel, the angular displacement of said rotatable wheel being proportional to linear travel of said rod,
   and an encoder for measuring said rotation of said rotatable wheel and for encoding information relating to said rotation of said rotatable wheel, wherein
   said drive assembly comprises a plurality of pulleys for engaging said movable rod in frictional contact with said circumference of said rotatable wheel, and an engagement assembly for moving said pulleys away from said circumference of said rotatable wheel to enable said movable rod to be inserted between said pulleys and said circumference of said rotatable wheel and for pulling said pulleys toward said circumference of said rotatable wheel in a manner such that said pulleys engage said movable rod in frictional contact with said circumference of said rotatable wheel, and
   said motion transducer comprises a slot through which said movable rod may be inserted and removed when said pulleys are positioned away from said circumference of said rotatable wheel.

8. A motion transducer in accordance with claim 7 wherein said engagement assembly comprises
   a plurality of springs
   a bar,
   a plurality of arms connecting said springs to said bar,
   a plurality of shafts around which said pulleys rotate,
   a plurality of arms connecting said springs to said shafts around which said pulleys rotate,
   a plurality of pivoted idler hinges attached to said pulleys for guiding said pulleys as said pulleys move toward and away from said circumference of said rotatable wheel,
   and a rotatable cam attached to said bar for moving said bar in a direction toward said rotatable wheel to cause said pulleys to move away from said circumference of said rotatable wheel, and for moving said bar in a direction away from said rotatable wheel to cause said pulleys to move toward said circumference of said rotatable wheel to engage said movable rod in frictional contact with said circumference of said rotatable wheel.

9. A method of measuring motion of a rod, comprising the steps of
   engaging a longitudinally movable rod in contact with the circumference of a rotatable wheel, in a manner such that linear motion of said rod causes rotation of said rotatable wheel, the angular displacement of said rotatable wheel being proportional to linear travel of said longitudinally movable rod,
   detecting said rotation of said rotatable wheel,
   encoding information relating to said rotation of said rotatable wheel,
   and coupling a rotatable component with a shaft that is connected to the center of said rotatable wheel and that rotates axially with said rotatable wheel,
   said longitudinally movable rod being disengaged from contact with said circumference of said wheel while said rotatable component is coupled with said shaft.

10. A method in accordance with claim 9 wherein said step of coupling said rotatable component with said shaft comprises the step of attaching an adapter to said shaft, said adapter causing a switch to indicate that said adapter is attached to said shaft to couple said rotatable component with said shaft.

11. A method in accordance with claim 9 wherein said step of encoding said information comprises encoding said information digitally.

12. A method of measuring motion of a rod, comprising the steps of engaging a longitudinally movable rod in contact with the circumference of a rotatable wheel, in a manner such that linear motion of said rod causes rotation of said rotatable wheel, the angular displacement of said rotatable wheel being proportional to linear travel of said longitudinally movable rod, detecting said rotation of said rotatable wheel, and encoding information relating to said rotation of said rotatable wheel, wherein said step of engaging said longitudinally movable rod in contact with said circumference of said rotatable wheel comprises the steps of moving a plurality of pulleys in a direction away from said circumference of said rotatable wheel, inserting said longitudinally movable rod between said pulleys and said circumference of said rotatable wheel, and pulling said pulleys toward said rotatable wheel in a manner such that said pulleys engage said movable rod in frictional contact with said circumference of said rotatable wheel.

* * * * *